W. J. MOYLE.
BIRD TRAP.
APPLICATION FILED SEPT. 23, 1915.
1,215,048.
Patented Feb. 6, 1917.
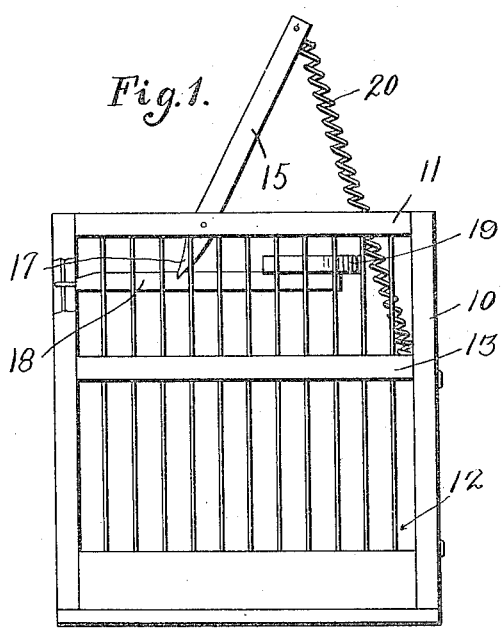
Fig. 1.
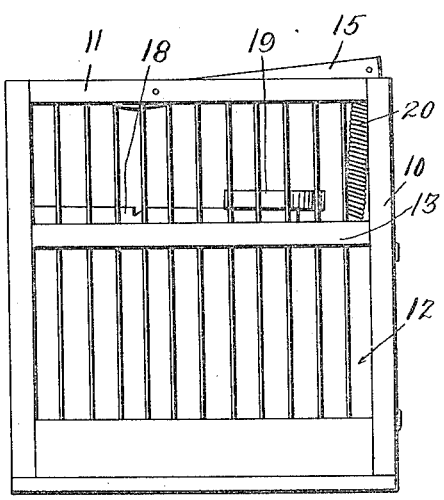
Fig. 2.
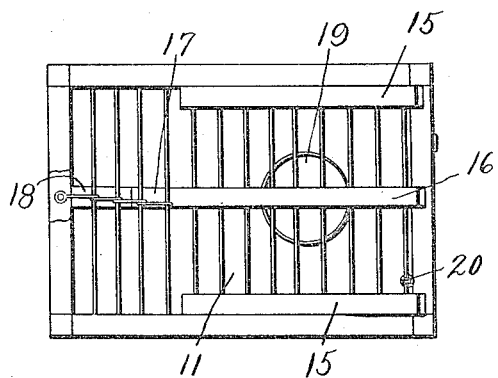
Fig. 3.
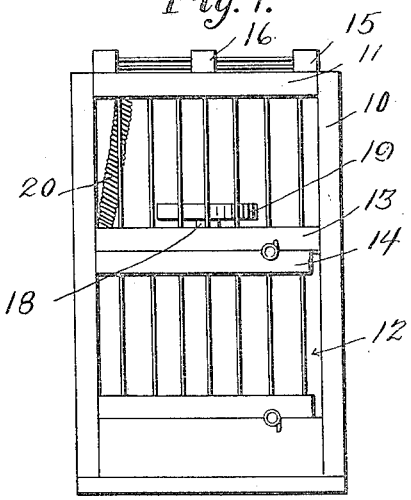
Fig. 4.
Witnesses
Arthur K. Moore
N. M. Test.
Inventor
W. J. Moyle
By
Attorneys

UNITED STATES PATENT OFFICE.

WILLIAM JAMES MOYLE, OF HOUGHTON, MICHIGAN.

BIRD-TRAP.

1,215,048.  Specification of Letters Patent.  Patented Feb. 6, 1917.

Application filed September 23, 1915. Serial No. 52,272.

*To all whom it may concern:*

Be it known that I, WILLIAM J. MOYLE, a citizen of the United States, residing at Houghton, in the county of Houghton, State of Michigan, have invented certain new and useful Improvements in Bird-Traps; and I do hereby declare the following to be a full, clear, and exact description of the invention, such as will enable others skilled in the art to which it appertains to make and use the same.

This invention relates to improvements in bird traps.

One object of the invention is to provide a simple and novel device of this character which can be manufactured and sold at a comparatively low cost.

Another object is to provide a device of this character which includes novel and improved means for trapping birds.

Another object is to provide a trap which is adapted to contain another bird as a decoy below the trap chamber.

Other objects and advantages will be apparent from the following description when taken in connection with the accompanying drawing.

In the drawing:

Figure 1 is a side elevation of my improved trap in set position;

Fig. 2 is a similar view showing the same in sprung position;

Fig. 3 is a top plan view; and

Fig. 4 is an end view.

Referring particularly to the accompanying drawing, there is shown a cage 10 which comprises an upper trap compartment 11 and a lower decoy compartment 12, the said compartments being separated by the open work floor 13. In one end of the lower compartment is mounted a hinged door 14 by means of which access is gained to the interior of said compartment to insert or remove the decoy bird. In the top of the upper compartment is mounted a hinged door 15 which includes a central strip 16 extending beyond the pivotal point of the door and into the compartment where it is reduced to form a flattened point 17. Mounted for vertical sliding movement, as shown at 16', on one of the bars of the rear wall of the upper compartment is a trip lever 18, the forward end of which is provided with a pan 19 for the reception of bait. Connected to the free end of the door 15, at one side thereof, and to the floor 13 is a spring 20 which normally holds the door in closed position. The pan carried end of the trip lever is disposed under the opening which is controlled by the door, and in the upper side of the lever rearwardly of the pan is a notch 21 in which the said reduced end 17 of the member 16 is adapted to be engaged to hold the door in elevated or open position and the bait pan within easy access of the birds.

Assuming the pan to be supplied with bait, and the lever 18 in position to hold the door 15 raised, a bird will fly or hop into the upper compartment 11 and peck at the bait in the pan. This pecking will depress the lever 18 and release the end 17 from the notch, thus permitting the spring to close the door and trap the bird.

The device is of extremely simple construction and operation and is effective in use. Attention is called to the fact that should a bird stand on the upper edge of the compartment 11 and reach over to peck at the bait in the pan sufficiently to release the lever, the door would be suddenly drawn downwardly by the spring and knock the bird into the compartment.

What is claimed is:

1. A bird trap comprising a cage divided into an upper trap chamber and a lower decoy chamber, a pivoted spring urged door in the top of the trap chamber, and a bait lever movably mounted on the rear wall of the trap chamber and formed with a notch intermediate its length for the reception of the lower and pointed end of said door to hold the door against the resilient closing means.

2. A bird trap comprising a cage, the walls of which include vertical spaced bars, a pivoted spring closed door in the top of the cage and having an inner pointed end, and a combined bait holder and detent mounted for vertical sliding movement on one of the bars of the rear wall of the cage, said detent having a bait pan on the forward end thereof and a notch intermediate its length for the reception of the pointed end of the door to hold said door in open position.

In testimony whereof, I affix my signature, in the presence of two witnesses.

WILLIAM JAMES MOYLE.

Witnesses:
 H. E. LUKEY,
 JAMES E. LEVIS.

Copies of this patent may be obtained for five cents each, by addressing the "Commissioner of Patents, Washington, D. C."